United States Patent
Hara et al.

(10) Patent No.: US 7,486,466 B2
(45) Date of Patent: Feb. 3, 2009

(54) RAMP-POSITION DETECTING DEVICE, RAMP-POSITION DETECTING METHOD, AND STORAGE DEVICE

(75) Inventors: Takeshi Hara, Kawasaki (JP); Yoshifumi Obara, Higashine (JP)

(73) Assignee: Fujitsu Limited, Kawasaki (JP)

( * ) Notice: Subject to any disclaimer, the term of this patent is extended or adjusted under 35 U.S.C. 154(b) by 59 days.

(21) Appl. No.: 11/584,720

(22) Filed: Oct. 20, 2006

(65) Prior Publication Data

US 2007/0291394 A1 Dec. 20, 2007

(30) Foreign Application Priority Data

Jun. 15, 2006 (JP) ............... 2006-166614

(51) Int. Cl.
*G11B 21/02* (2006.01)
(52) U.S. Cl. .................................. 360/75
(58) Field of Classification Search ............ 360/75, 360/69, 53, 77.02, 78.04
See application file for complete search history.

(56) References Cited

U.S. PATENT DOCUMENTS

| | | | |
|---|---|---|---|
| 5,973,870 A * | 10/1999 | Boutaghou et al. ............ 360/53 |
| 6,229,663 B1 * | 5/2001 | Yoneda et al. ................. 360/75 |
| 6,496,319 B1 * | 12/2002 | Kusumoto et al. ............. 360/75 |
| 6,594,102 B1 | 7/2003 | Kanda et al. |
| 6,661,598 B2 * | 12/2003 | Kusumoto et al. ............. 360/75 |
| 6,738,216 B2 * | 5/2004 | Kawana et al. ................. 360/75 |
| 6,754,027 B2 * | 6/2004 | Hirano et al. ................. 360/75 |
| 6,922,302 B2 * | 7/2005 | Kusumoto et al. ............. 360/75 |
| 7,064,917 B2 * | 6/2006 | Shin ............................. 360/75 |
| 2001/0019463 A1 * | 9/2001 | Drouin ......................... 360/75 |
| 2007/0086108 A1 * | 4/2007 | Kuroki et al. ................. 360/75 |

FOREIGN PATENT DOCUMENTS

| | | |
|---|---|---|
| JP | 2000-21073 | 1/2000 |
| JP | 2004-234806 | 8/2004 |

* cited by examiner

*Primary Examiner*—Fred Tzeng
(74) *Attorney, Agent, or Firm*—Greer, Burns & Crain, Ltd.

(57) ABSTRACT

A storage medium (magnetic disk) in a storage device (magnetic disk device) includes a disk that stores therein data, a head that reads and writes data, a voice motor coil (VCM) that controls the head, and a ramp where the head is retracted. The storage device detects a current used for speed control during unloading of the head, and determines whether the current exceeds a predetermined value. The storage device detects a head position where the current exceeds a predetermined value as a ramp position, stores the ramp position, and unloads the head based on the ramp position.

9 Claims, 5 Drawing Sheets

A SCHEMATIC FOR EXPLAINING AN OVERVIEW AND SALIENT FEATURE OF A MAGNETIC DISK DEVICE ACCORDING TO A FIRST EMBODIMENT

A BLOCK DIAGRAM OF A CONSTITUENT OF THE MAGNETIC DISK DEVICE ACCORDING TO THE FIRST EMBODIMENT

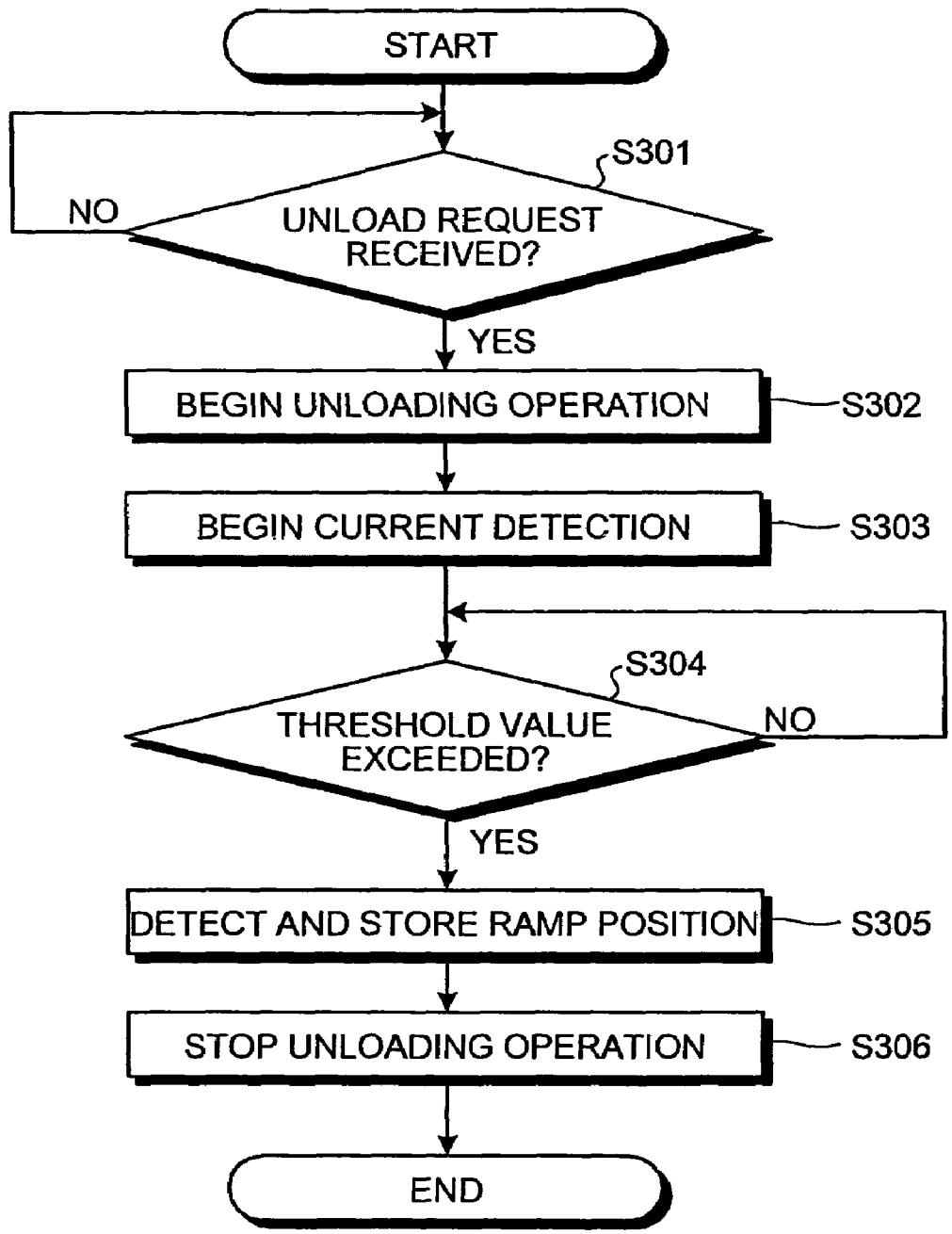

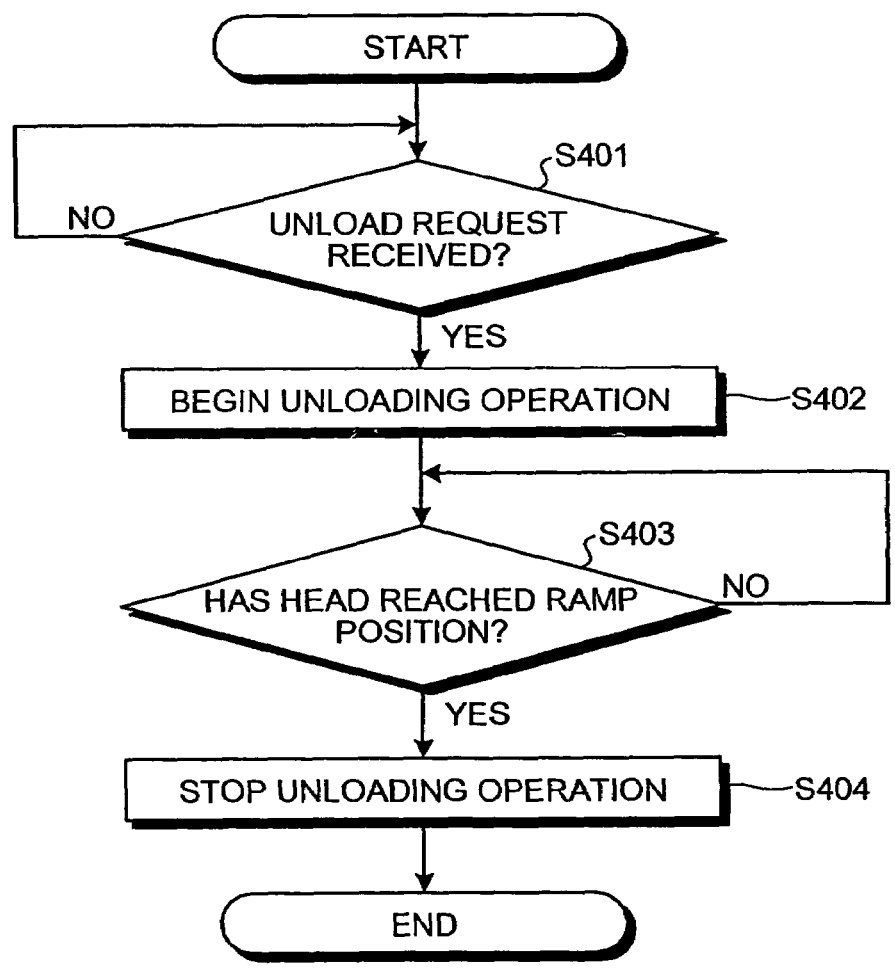

FIG. 5

A COLLECTION OF TABLES AND A CHART FOR EXPLAINING THE SALIENT FEATURE OF RAMP-POSITION DETECTION OF THE MAGNETIC DISK DEVICE ACCORDING TO THE FIRST EMBODIMENT (1)

| | POSITION OF HEAD WHEN HEAD COMES IN CONTACT WITH RAMP | POSITION OF HEAD WHEN RAMP IS DETECTED | DISTANCE THAT HEAD MOVES |
|---|---|---|---|
| CASE 1 | 31 | 41 | 10 |
| CASE 2 | 31 | 34 | 3 |
| CASE 3 | 30 | 37 | 7 |
| | | AVE. | 7 |

(2)

| | POSITION OF HEAD WHEN HEAD COMES IN CONTACT WITH RAMP | POSITION OF HEAD WHEN RAMP IS DETECTED | DISTANCE THAT HEAD MOVES |
|---|---|---|---|
| CASE 1 | 31 | 33 | 2 |
| CASE 2 | 31 | 33 | 2 |
| CASE 3 | 29 | 33 | 4 |
| | | AVE. | 3 |

(3)

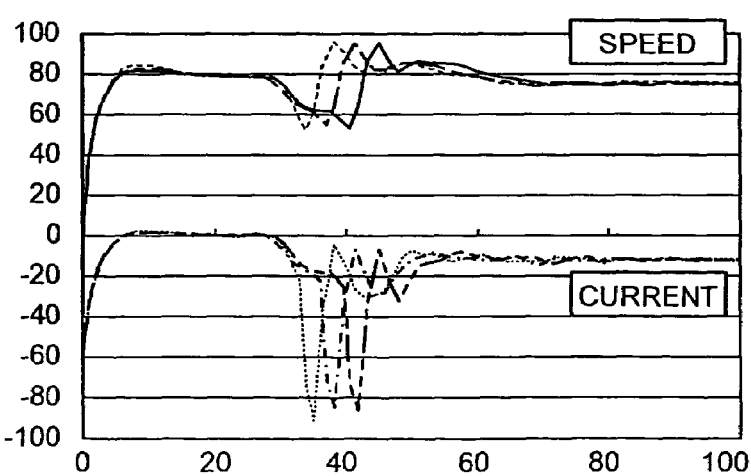

RAMP IS DETECTED WHEN SPEED IS 55
RAMP IS DETECTED WHEN CURRENT IS -15

RAMP-POSITION DETECTING DEVICE, RAMP-POSITION DETECTING METHOD, AND STORAGE DEVICE

BACKGROUND OF THE INVENTION

1. Field of the Invention

The present invention relates to a ramp-position detecting device that detects and stores a ramp position to which a head of a storage medium is retracted, a ramp-position detecting method, and a storage device.

2. Description of the Related Art

To achieve high impact resistance, magnetic disks, such as hard disk drive (HDD), use a load/unload system. In the load/unload system, when a magnetic disk is not rotating, a head is retracted to a sloped portion called a ramp in the outermost periphery of the magnetic disk, and when the magnetic disk is rotating at a slow speed to be activated or stopped, the head is slid onto the ramp. Thus, when data reading or writing is not taking place, the head is prevented from coming in contact with a surface of the magnetic disk, which achieves the magnetic disk with high impact resistance.

In the load/unload system, in actual use (unloading) at the user-end, the ramp position needs to be stored beforehand so that the head can move to the ramp position. Various technologies have been proposed for detecting the ramp position.

For example, Japanese Patent Application Laid-open No. 2004-234806 discloses a technology whereby a control range of servo information is kept narrow at all times, and a position of a head where the speed of the head changes (i.e., the speed slows down) during unloading operation is taken as a ramp position where the head contacts a ramp. The ramp position thus determined is stored, and in unloading operation at the user-end, the head is retracted to the ramp position.

However, in the conventional technology, the control range of the servo information is narrow to facilitate the detection of a decrease in head speed. Consequently, the magnetic disk becomes vulnerable to disturbances (such as vibrations, jolts). Further, loss of friction of the ramp leads to a high probability of faulty ramp-position detection.

SUMMARY OF THE INVENTION

It is an object of the present invention to at least partially solve the problems in the conventional technology.

According to an aspect of the present invention, a ramp-position detecting device that detects a position of a ramp where a head of a storage medium is retracted, includes a current detecting unit that detects a current used for speed control for unloading of the head, a current determining unit that determines whether the current detected by the current detecting unit exceeds a predetermined value, and a ramp detecting unit that detects a position of the head where the current exceeds the predetermined value as the position of the ramp.

According to another aspect of the present invention, a method for detecting a position of a ramp where a head of a storage medium is retracted, includes detecting a current used for speed control for unloading of the head, determining whether detected current exceeds a predetermined value, and detecting a position of the head where the current exceeds the predetermined value as the position of the ramp.

According to still another aspect of the present invention, a storage device in which a head of a storage medium is retracted to a ramp when data reading or writing is not taking place, includes a current detecting unit that detects a current used for speed control for unloading of the head, a current determining unit that determines whether the current detected by the current detecting unit exceeds a predetermined value, a ramp-position detecting unit that detects a position of the head where the current exceeds the predetermined value as the position of the ramp, a ramp-position storing unit that stores the position of the ramp detected by the ramp-position detecting unit, and an unload control unit that unloads the head based on the position of the ramp stored in the ramp-position storing unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a flowchart of an unload process before shipment of the magnetic disk device;

FIG. 4 is a flowchart of an unload process after shipment of the magnetic disk device; and FIG. 5 is a collection of tables and a chart for explaining the salient feature of ramp-position detection of the magnetic disk device.

DETAILED DESCRIPTION OF THE PREFERRED EMBODIMENTS

Exemplary embodiments of the present invention are described below with reference to the accompanying drawings.

An overview and salient feature of a storage device (magnetic disk device) with a ramp-position detecting device according to an embodiment of the present invention is described first.

Figure 1:
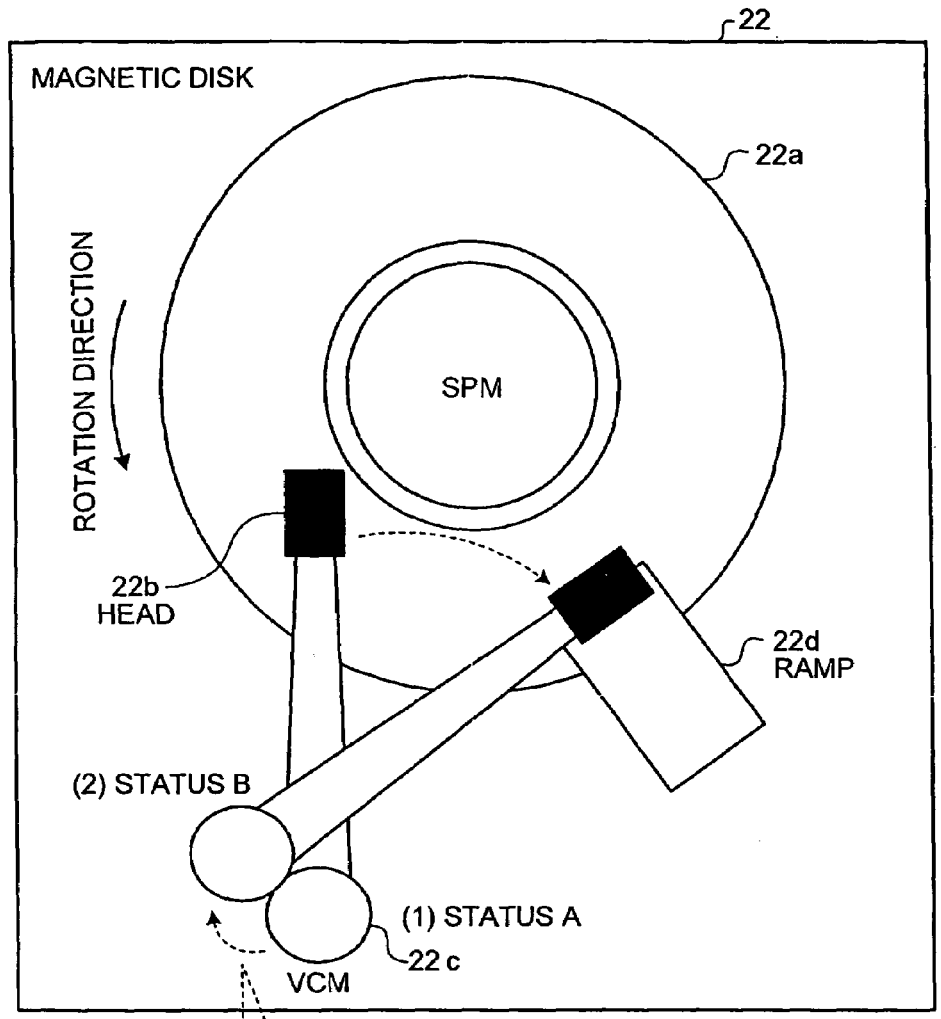
FIG. 1 is a schematic for explaining an overview and salient feature of a magnetic disk device according to an embodiment of the present invention.
Figure 1:
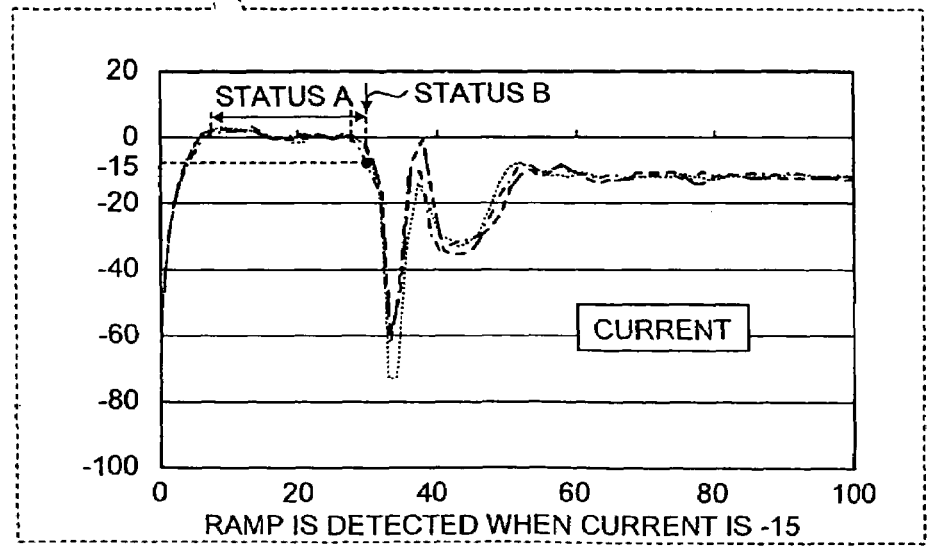

FIG. 1 is a schematic for explaining the overview and salient feature of a magnetic disk device 20 according to the embodiment.

A magnetic disk 22 in the magnetic disk device 20 includes a disk 22a that stores data, a head 22b that reads or writes data, a voice coil motor (VCM) 22c that controls the head 22b, and a ramp 22d where the head 22b is retracted.

The magnetic disk device 20 detects and stores a position of the ramp 22d before shipping. When performing the unloading of the head 22b at the user-end, the magnetic disk device 20 refers to the stored information pertaining to the position of the ramp 22d, and retracts the head 22b to the ramp 22d.

In broad overview, the magnetic disk device 20 detects and stores the position of the ramp 22d, and is capable of accurately detecting the position of the ramp 22d to which the head 22b of the magnetic disk 22 is to be retracted.

Specifically, the magnetic disk device 20 detects the speed of the head 22b, supplies, according to the speed, current to the VCM 22c that controls the speed of the head 22b. The VCM 22c in turn controls the speed of the head 22b according to the current. For example, when the head 22b contacts the ramp 22d and its speed slows down, the magnetic disk device 20 increases current supplied to the VCM 22c, so that the VCM 22c increases the speed of the head 22b based on the current.

The magnetic disk device 20 detects the current required for speed control during the unloading of the head 22b. Specifically, upon receiving an unload request from a host computer (not shown), the magnetic disk device 20 detects the current used by the VCM 22c for speed control on the head 22b based on a voltage of back electromotive force (EMF) from the magnetic disk 22. For example, the magnetic disk device 20 detects the current used by the VCM 22c for speed control on the head 22b based on a voltage of back EMF from the magnetic disk 22 during the movement of the head 22b from Status A ((1) of FIG. 1) to Status B ((2) of FIG. 1).

Along with the detection of the current, the magnetic disk device 20 checks whether the current exceeds a predetermined value. For example, with reference to FIG. 1, the magnetic disk device 20 checks whether the detected current exceeds a predetermined value (15 Amperes, for example) during the movement of the head 22b from Status A to Status B.

If the detected current exceeds the predetermined value, the magnetic disk device 20 detects as the ramp position a position of the head 22b where the current is detected. Specifically, if the detected current exceeds, for example, 15 Amperes ((2) Status B of FIG. 1), the magnetic disk device 20 detects the position of the head 22b where the current exceeds 15 Amperes as the ramp position and stores it.

Thus, according to the embodiment, during the unloading of the head 22b, the ramp position is detected from the current used for controlling the speed of the head 22b; when the head 22b contacts the ramp 22d, the speed of the head 22b drops, and the current produced to increase the dropping speed is used for detecting the ramp position. Therefore, the need is eliminated for narrowing a control range of servo information, and disturbance on the magnetic disk 22 can be minimized. As a result, the ramp position can be accurately detected. Further, when performing unloading at the user-end, the head 22b can be accurately unloaded to the ramp position.

Figure 2:
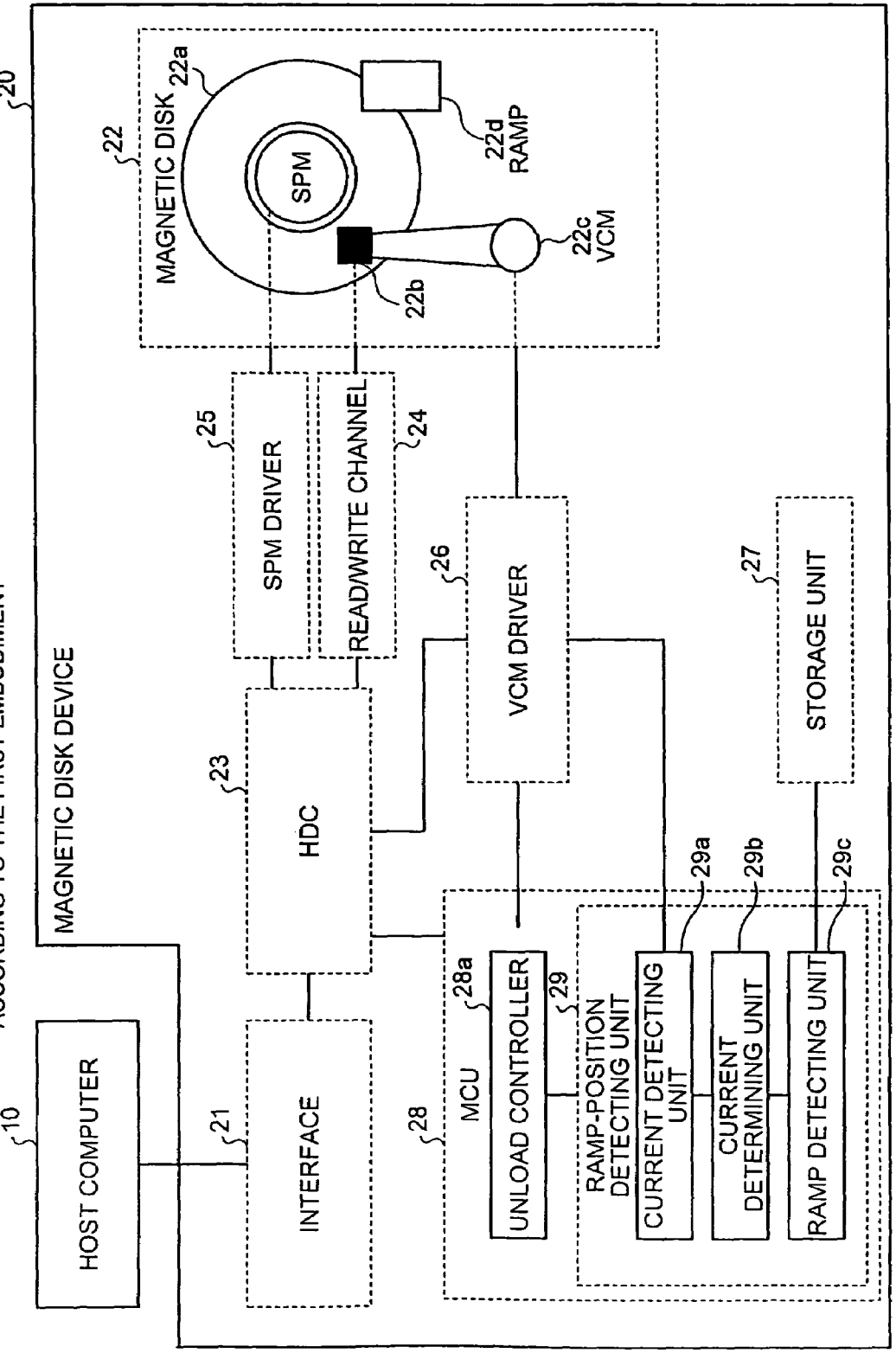
FIG. 2 is a block diagram of the magnetic disk device.

FIG. 2 is a block diagram of the magnetic disk device 20. The magnetic disk device 20 includes an interface 21, the magnetic disk 22, a hard disk controller (HDC) 23, a read/write channel 24, a spindle motor (SPM) driver 25, a voice motor coil (VCM) driver 26, a storage unit 27, and a micro control unit (MCU) 28.

The interface 21 controls communication pertaining to data exchange between the magnetic disk device 20 and a host computer 10. Specifically, the interface 21 receives various control requests (read request, write request, etc.) sent from the host computer 10, and sends the received request to the HDC 23, described later.

The magnetic disk 22 is a recording medium for writing data to and reading data from, and is built in the magnetic disk device 20. In particular relevance to the embodiment of the present invention, the magnetic disk 22 includes the disk 22a, the head 22b, the VCM 22c, and the ramp 22d.

The disk 22a is where data stored in the magnetic disk 22 are written. Specifically, the disk 22a is written thereon user data, servo information, etc. The head 22b writes data to the disk 22a and reads data from the disk 22a. Specifically, the head 22b writes user data to the disk 22a or reads user data or servo information from the disk 22a upon receiving an instruction from the magnetic disk device 20.

The VCM 22c controls the position or the speed of the head 22b. Specifically, speeds up or stops the head 22b based on the current supplied by the VCM driver 26 described later. The ramp 22d is where the head 22b is retracted. Specifically, upon receiving an unload request from the magnetic disk device 20, the VCM 22c retracts the head 22b to the ramp 22d.

The HDC 23 receives various instructions from the connected host computer 10 via the interface 21, and sends the received instructions to the relevant functional units. Specifically, the HDC 23 sends an instruction to control a spindle motor (SPM) to the SPM driver 25, an instruction to control the head 22b to either the MCU 28 or the VCM driver 26, and a data read/write instruction to the read/write channel 24 so that data can be written to the magnetic disk 22. The HDC 23 also sends data to the host computer 10.

The read/write channel 24 controls reading data from and writing data to the magnetic disk 22. Specifically, the read/write channel 24 includes a modulation circuit for writing data to the magnetic disk 22 and a demodulation circuit for reading data from the magnetic disk 22.

The SPM driver 25 controls the SPM. Specifically, upon a request/instruction from the MCU 28, the SPM driver 25 performs tasks such as supplying current to activate the SPM, supplying current to stop the SPM, and sending a back EMF signal detected from the SPM to the MCU 28.

The VCM driver 26 sends the VCM 22c various types of control requests to control the speed and the position of the head 22b. Specifically, the VCM driver 26 monitors the voltage of the back EMF (speed signal) of the VCM 22c, and supplies the current required to control the speed of the head 22b to the VCM 22c. More specifically, the VCM driver 26 maintains the speed of the head 22b constant during the unloading of the head 22b. For example, if the speed of the head 22b drops due to contact with the ramp 22d, the VCM driver 26 increases the current supplied to maintain the speed of the head 22b constant so that the dropped speed increases.

The storage unit 27 stores therein data and programs required for various processes of the MCU 28. Specifically, the storage unit 27 stores therein a threshold value for determining whether the current detected by a ramp-position detecting unit 29 exceeds a predetermined value and position data of the ramp 22d.

The MCU 28 includes an internal memory for storing programs for various processes and data required for the processes, and performs the processes using the programs and the data. In particular relevance to the embodiment of the present invention, the MCU 28 includes an unload controller 28a and the ramp-position detecting unit 29.

The unload controller 28a instructs the VCM driver 26 to perform unloading of the head 22b. Specifically, the unload controller 28a receives an unload request from the HDC 23, and sends an unload instruction to the VCM driver 26. In response to the unload instruction, the VCM driver 26 retracts the head 22b to the ramp 22d.

For example, before shipment of the magnetic disk device 20 at the factory-end (when the position of the ramp 22d is yet to be stored in the storage unit 27), the unload controller 28a sends an unload instruction to the VCM driver 26. The VCM driver 26 retracts the head 22b to the ramp 22d, upon which the ramp-position detecting unit 29 detects the position of the ramp 22d.

After shipment of the magnetic disk device 20 at the user-end (when the position of the ramp 22d is already stored in the storage unit 27), the unload controller 28a sends an unload instruction to the VCM driver 26 to unload the head 22b onto the ramp 22b at the position stored in the storage unit 27. Upon receiving the unload instruction, the VCM driver 26 retracts the head 22b to the ramp 22d.

The ramp-position detecting unit 29 detects the position of the ramp 22d before shipment of the magnetic disk device 20 at the factory-end. In particular relevance to the embodiment of the present invention, the ramp-position detecting unit 29 includes a current detecting unit 29a, a current determining unit 29b, and a ramp detecting unit 29c, which are configured as firmware program modules of a central processing unit (CPU). In the embodiment, the function of the ramp-position detecting unit 29 is implemented by a CPU firmware program; however, the ramp-position detecting unit 29 can be otherwise configured.

The current detecting unit 29a detects the current used for speed control when the head 22b is unloaded. Specifically, upon receiving an unload request (instruction) from the HDC 23 of the magnetic disk device 20 at the factory-end, the current detecting unit 29a detects the current used by the VCM driver 26 for speed control on the head 22b to unload the head 22b based on the voltage of the back EMF detected by the VCM driver 26.

The current determining unit 29b checks whether the current detected by the current detecting unit 29a exceeds a predetermined value. Specifically, the current determining unit 29b determines whether the current detected by the current detecting unit 29a exceed a threshold value (15 Amperes, for example) stored in the storage unit 27. If the current exceeds the threshold value, the current determining unit 29b informs the ramp detecting unit 29c that the current exceeds the threshold value (such as by sending the value of the current). If not, the current determining unit 29b goes on to check whether the current detected by the current detecting unit 29a exceeds the threshold value stored in the storage unit 27.

When the current determining unit 29b determines that the current exceeds the predetermined value, the ramp detecting unit 29c detects the position of the head 22b at which the current has been detected as the position of the ramp 22d. Specifically, when the current determining unit 29b determines that the current exceeds the predetermined value (15 Amperes, for example), the ramp detecting unit 29c detects the position of the head 22b ((2) Status B of FIG. 1) at which the current has been detected as the position of the ramp 22d, and stores the detected position of the ramp 22d in the storage unit 27.

The operation of the magnetic disk device 20 is described below. FIG. 3 is a flowchart of the unload process before shipment of the magnetic disk device 20 at the factory-end. FIG. 4 is a flowchart of the unload process after shipment of the magnetic disk device 20.

The unload process of the magnetic disk device 20 at the factory-end is described first.

Upon receiving an unload request (or an unload instruction) from the host computer 10 (Yes at step S301), the unload controller 28a of the magnetic disk device 20 begins the unloading of the head 22b (step S302).

The current detecting unit 29a detects the current used for speed control during the unloading of the head 22b (step S303). Concurrently with the detection of the current, the current determining unit 29b determines whether the current detected by the current detecting unit 29a exceeds a predetermined value (step S304).

If the current exceeds the predetermined value (Yes at step S304), the ramp detecting unit 29c detects the position of the head 22b at which the current has been detected as the position of the ramp 22d, and stores the detected position of the ramp 22d in the storage unit 27 (step S305). The magnetic disk device 20 then stops the unloading operation (step S306).

If the current does not exceed the predetermined value (No at step S304), the current detecting unit 29a continues to detect the current used for speed control during the unloading of the head 22b, and the current determining unit 29b again determines whether the current exceeds the predetermined value.

The unload process of the magnetic disk device 20 at the user-end is described below.

Upon receiving an unload request from the host computer 10 (Yes at step S401), the unload controller 28a of the magnetic disk device 20 begins the unloading operation (step S402).

The unload controller 28a refers to the position information of the ramp 22d stored in the storage unit 27, and determines whether the head 22b has reached the position of the ramp 22d (step S403).

If the head 22b has reached the position of the ramp 22d (Yes at step S403), the unload controller 28a stops the unloading operation (step S404).

If the head 22b has not reached the position of the ramp 22d (No at step S403), the unload controller 28a continues to check whether the head 22b has reached the position of the ramp 22d while the unload controller 28a is performing the unloading operation.

As described above, according to the embodiment, the current used for speed control during the unloading of the head 22b is detected. Then, it is determined whether the detected current exceeds a predetermined value. If the current exceeds a predetermined value, the position of the head 22b when the current has been detected is taken as the position of the ramp 22d. Consequently, the current produced to increase the speed of the head 22b that is slowed down by contact with the ramp 22d is detected. As a result, without the need for reducing the control range of the servo information, the impact of disturbance can be minimized, and thereby the position of the ramp 22d can be accurately detected. In addition, the position information of the ramp 22d is stored before shipment of the magnetic disk device 20, the head 22b can be accurately unloaded onto the position of the ramp 22d. Thus, damage to the head 22b can be prevented, which increases the utility value of the magnetic disk device 20.

Moreover, effect from loss of friction of the ramp 22d can be minimized. Therefore, the position of the ramp 22d can be accurately detected even in the magnetic disk device 20 in which the ramp 22d has low friction. Further, the distance the head 22b moves from the time it contacts the ramp 22d to the time the ramp 22d is detected is shorter compared to that when the position of the ramp 22d is detected based on a decrease in the speed of the head 22b. Thus, the position of the ramp 22d can be detected more accurately.

Furthermore, the speed at which the head 22b of the magnetic disk 22 moves is maintained constant and the current used for speed control during the unloading of the head 22b is detected. The amount of current detected is also constant, which makes it easy to detect the current supplied to increase the speed of the head 22b that slows down due to contact with the ramp 22d. Consequently, the position of the ramp 22d can be detected more accurately compared to when the head 22b moves at a variable speed during the unloading operation (because the speed is variable, the current supplied also varies).

FIG. 5 is a collection of tables and a chart for explaining the salient feature, namely, ramp-position detection, of the magnetic disk device 20. FIG. 5 depicts the distance the ramp position detected moves after contacting the ramp 22d in three times of the unloading operation.

As in the conventional technology, when the position of the ramp 22d is detected by detecting the speed of the head 22b, the average distance that the head 22b moves from the time it contacts the ramp 22d to the time the ramp 22d is detected is 7 millimeters (see (1) of FIG. 5). On the other hand, when the position of the ramp 22d is detected by detecting the current supplied to the head 22b, the average distance that the head 22b moves from the time it contacts the ramp 22d to the time the ramp 22d is detected is 3 millimeters (see (2) of FIG. 5). In other words, the distance that the head 22b moves from the time it contacts the ramp 22d to the time the ramp 22d is detected is shorter when the position of the ramp 22d is detected by detecting the current supplied to the head 22b. Thus, the position of the ramp 22d can be detected more accurately.

FIG. 5 (3) is a graph depicting variations in the speed of the head 22b and variations in the current supplied to the head 22b. The speed varies before and after exceeding its threshold value (55), while the current less varies before and after exceeding its threshold value (−15). It can thus be understood that the position of the ramp 22d can be detected more accurately.

The embodiment is susceptible to various modifications and alternative forms. Examples of the modifications are described below.

In the embodiment described above, the unloading operation is performed once to detect the ramp position. However, the unloading operation can be performed a plurality of times, and an average ramp position can be calculated from the detected ramp positions. In this case, for example, incorrect ramp-position detection resulting from unforeseen reasons, such as a sudden increase in current flow which exceeds a predetermined value (threshold value), can be avoided. Thus, a more accurate ramp position can be detected.

In the embodiment described above, the speed of the head during the unloading operation is maintained constant. However, the speed of the head during the unloading operation can be varied. For example, the speed of the head can be reduced gradually during the unloading operation.

The constituent elements of the magnetic disk device are merely conceptual and not necessarily physically resemble the structures shown in the drawings. For example, the arrangement of the respective units is not limited to that shown in the drawings, and can be functionally or physically separated or integrated, partly or wholly, according to the load or usage (for example, the unload controller and the ramp-position detecting unit can be integrated). Besides, the same function of the magnetic disk device can be entirely or partially realized by CPU or a control unit such as a micro control unit (MCU) and a micro processing unit (MPU), or by a computer program executed by CPU, MCU or MPU. The magnetic disk device can also be implemented in wired-logic hardware.

The process procedures, the control procedures, specific names, data and information containing various parameters mentioned in the description and drawings (for example, the graphs of FIGS. 1 and 5) can be changed as required unless otherwise specified.

The unload process described previously in connection with FIGS. 3 and 4 can be performed by software. In other words, a computer program can be executed on a computer (for example, the MCU 28 of the magnetic disk device 20) to perform the unload process. The program can be downloaded via a network such as the Internet, or can be stored in a computer-readable recording medium, such as a compact disk-read only memory (CD-ROM), magneto-optical (MO) disk, and digital versatile disk (DVD), to be read therefrom and executed by the computer.

As set forth hereinabove, according to an embodiment of the present invention, a distance that a head moves from the time it contacts a ramp to the time the ramp is detected is shorter compared to that when the ramp is detected based on a decrease in the speed of the head. Therefore, the position of the ramp can be detected more accurately. Moreover, ramp-position information is stored before shipment of a magnetic disk device, the head can be accurately unloaded onto the ramp position in actual use. Thus, the head is not unnecessarily damaged, which increases the utility value of the magnetic disk device.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A ramp-position detecting device that detects a position of a ramp where a head of a storage medium is retracted, the ramp-position detecting device comprising:
   a current detecting unit that detects a current used for speed control for unloading of the head;
   a current determining unit that determines whether the current detected by the current detecting unit exceeds a predetermined value; and
   a ramp detecting unit that detects a position of the head where the current exceeds the predetermined value as the position of the ramp.

2. The ramp-position detecting device according to claim 1, wherein
   the head is controlled to move at a constant speed during unloading operation, and
   the current detecting unit detects the current used for the speed control of the head.

3. The ramp-position detecting device according to claim 1, wherein the ramp detecting unit detects as the position of the ramp an average head position calculated from positions of the head detected by a plurality of unloading operations.

4. A method for detecting a position of a ramp where a head of a storage medium is retracted, the method comprising:
   detecting a current used for speed control for unloading of the head;
   determining whether detected current exceeds a predetermined value; and
   detecting a position of the head where the current exceeds the predetermined value as the position of the ramp.

5. The method according to claim 4, further comprising controlling the head to move at a constant speed during unloading operation, wherein
   the detecting a current includes detecting the current used for the speed control of the head.

6. The method according to claim 4, wherein the detecting a position includes detecting as the position of the ramp an average head position calculated from positions of the head detected by a plurality of unloading operations.

7. A storage device in which a head of a storage medium is retracted to a ramp when data reading or writing is not taking place, the storage device comprising:
   a current detecting unit that detects a current used for speed control for unloading of the head;
   a current determining unit that determines whether the current detected by the current detecting unit exceeds a predetermined value;
   a ramp-position detecting unit that detects a position of the head where the current exceeds the predetermined value as the position of the ramp;
   a ramp-position storing unit that stores the position of the ramp detected by the ramp-position detecting unit; and
   an unload control unit that unloads the head based on the position of the ramp stored in the ramp-position storing unit.

8. The storage device according to claim 7, wherein
the head is controlled to move at a constant speed during unloading operation, and
the current detecting unit detects the current used for the speed control of the head.

9. The storage device according to claim 7, wherein the ramp detecting unit detects as the position of the ramp an average head position calculated from positions of the head detected by a plurality of unloading operations.

* * * * *